Patented June 4, 1929.

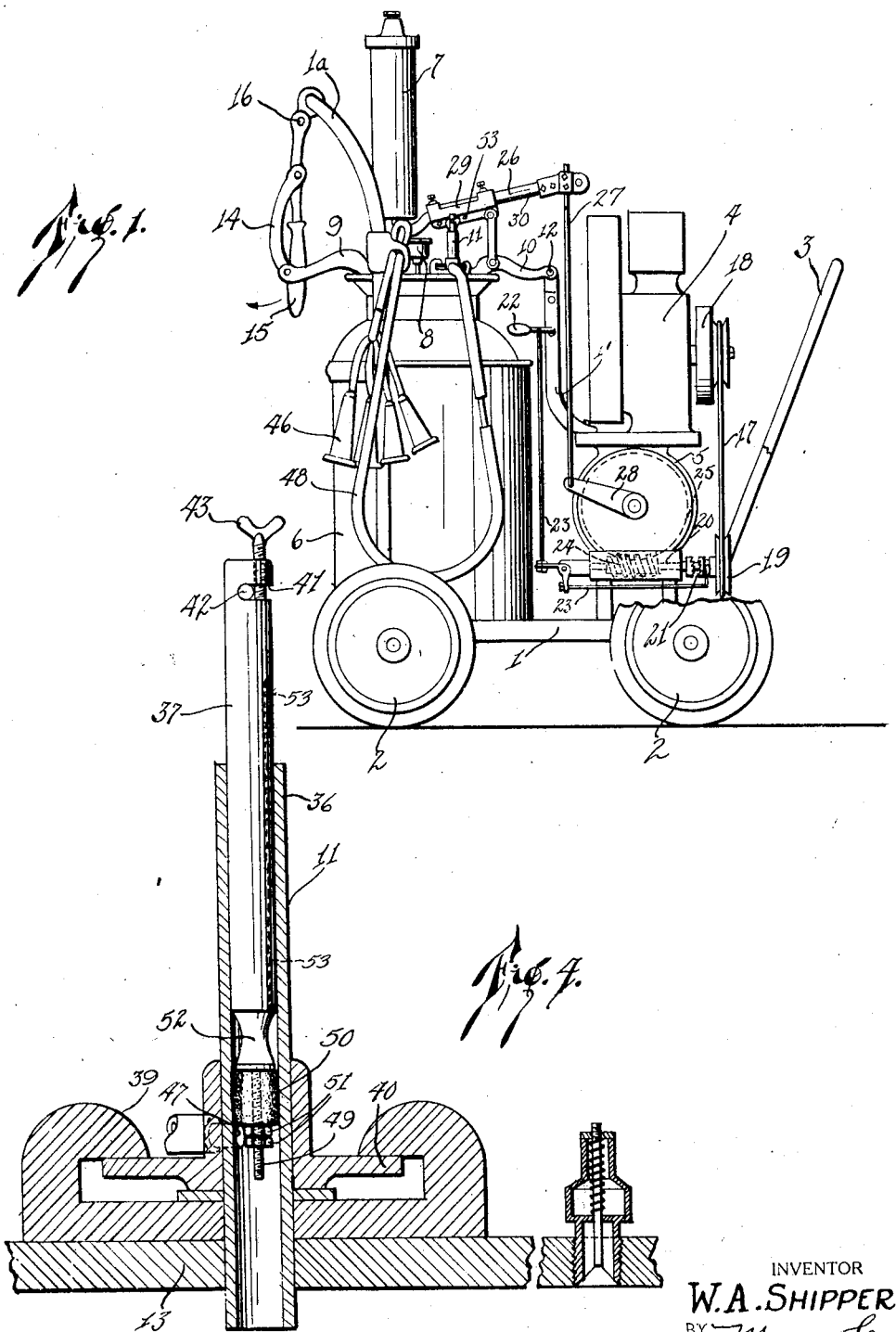

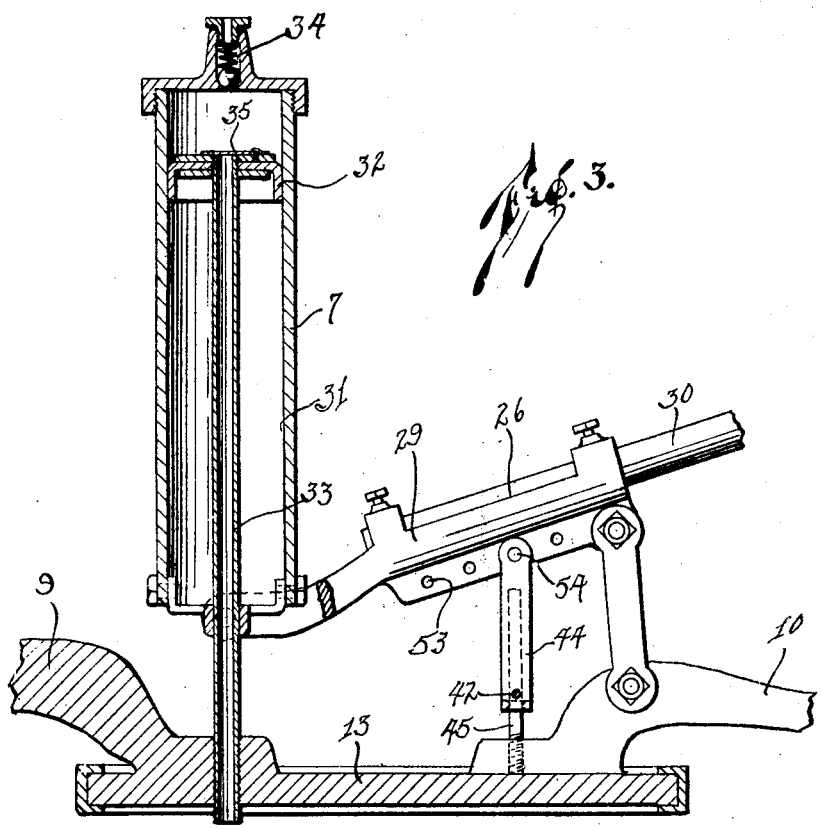
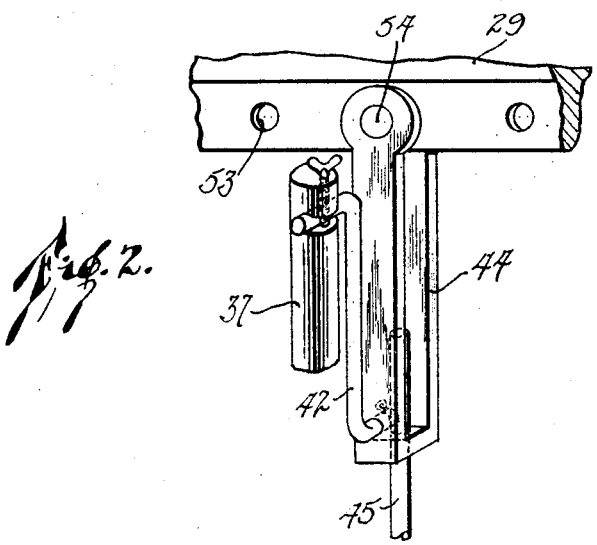

1,715,720

UNITED STATES PATENT OFFICE.

WARREN AQUILA SHIPPERT, OF DIXON, ILLINOIS.

MILKING MACHINE.

Application filed June 29, 1925. Serial No. 40,391.

My invention relates to improvements in milking machines, and it consists in the combinations, constructions, and arrangements herein described and claimed.

The difficulties in operation of most pulsators in milking machines on the market today is that they are actuated by changeable or varying air pressure, this pressure at first being admitted to one end of the piston and then to the other end for causing the piston to reciprocate. The least corrosion of the parts or the accumulation of oil and dirt on these parts will slow down the pulsations of the piston or stop them entirely. If the piston should be stopped with full suction on it would injure the cow by causing an arrest of blood circulation, and the upsetting of the cow's nervous system, thus causing a stoppage of the milk secretion and an ultimately caked udder. In addition most pulsators have a seat for the plunger to strike against and this constant striking causes a clinking sound which often annoys nervous cows.

The principal object of the invention is to provide a pulsator which has automatic means for relieving the vacuum and for admitting air under atmospheric pressure to the cow's udder, thereby simulating calf milking.

A further object of the invention is to provide a milking machine of the character described in which the moving parts of the pulsator are noiseless in operation.

Other objects and advantages will appear in the following specification, and the novel features of the invention will be particularly pointed out in the appended claims.

My invention is illustrated in the accompanying drawings, forming part of this application, in which Figure 1 is a side elevation of the device showing the pulsator connected to the other parts of the milking machine, Figure 2 is a detail view of a portion of the device, Figure 3 is a sectional view of the pump, and Figure 4 is a sectional view of the pulsator.

In carrying out my invention I provide a milking machine which in the present instance is adapted to be supported by a portable frame 1. The frame is mounted upon wheels 2 and is adapted to be moved from place to place by means of a handle 3.

The frame 1 carries an engine 4, a reduction gear mechanism 5, and a milk can 6. It will be noted from Figure 1 that the cover for the milk can is made of a casting and carries a pump 7, a vacuum gauge 8, arms 9 and 10 and a pulsator 11. The portion 1' of the frame 1 is pivotally secured to the arm 10 at 12, whereby the cover 13 is adapted to be swung away from the top of the can 6. The other arm 9 is pivotally secured to the portion 1ª of the frame 1 by means of a link 14 and a locking lever 15. From this construction it will be noted that when the lever 15 is swung in the direction of the arrow it will pivot about the point 16 so as to raise the cover 13 off from the can 6. The lever 15 when in the full line position is disposed off center and therefore locks the cover 13 to the can 6.

I will first describe the connection between the motor 4 and the pump 7. In the present form of the device, this comprises a belt 17 that connects a fly wheel 18 to a pulley 19. The pulley 19 is mounted upon a shaft 20 and is adapted to be operatively connected thereto by means of a clutch 21. The clutch 21 is moved into and out of engagement by a handle 22 and connecting links 23. A worm 24 is mounted upon the shaft 20 and meshes with a worm gear 25. These two gears constitute the reducing gear mechanism 5. In the present form of the device I have shown the worm gear as being a forty to one ratio.

The worm gear 25 is operatively connected to a lever 26 by means of a link 27 and an arm 28. The lever 26 is composed of a socket 29 in which an arm 30 is clamped. The arm 30 is connected to the link 27 in the present case, but if desired this arm could be disconnected from the link so as to provide a handle by means of which the machine could be manually operated.

The socket 29 in turn is connected to the casing 31 of the pump 7. Figure 3 clearly shows how the piston 32 within the casing 31 remains stationary and further shows how the piston is mounted upon a hollow rod 33, this rod in turn being screwed into the cover 13. The top of the casing 31 carries a spring pressed ball valve that closes when the casing is being moved upwardly and opens when the casing is being moved downwardly. A flap valve 35 is mounted upon the top of the piston 32 and closes when the casing 31 is on its down stroke, thus cutting off any flow of air through the rod 33, but which opens when the casing is on its up stroke. From this construction it will be apparent that when the casing is reciprocated by the motor 4, the air will gradually be exhausted from the milk can 6, thus creating a vacuum in the can. The vacuum gauge 8 indicates the extent of the vacuum within the can. A vacuum release valve is shown in Figure 4.

I make use of the vacuum in the can for drawing milk from the cows and for conveying this milk to the can. The means for causing a pulsating action on the cows is shown in Figure 4. I will first describe how the pulsator is connected to the other moving parts of the machine before setting forth the special construction of the pulsator. The pulsator comprises a tube 36 in which a rod 37 is slidably disposed. The tube extends through the cover 13 and is clamped in place by means of a casting 38 and clamping members 39. The clamping members 39 form a part of the cover 13. The casting 38 has lugs 40 which may be swung beneath the clamping members 39 so as to hold the tube in place and which also may be removed from the clamping members so as to permit the tube to be removed from the cover 13.

The top of the rod 37 has a groove 41 therein. The groove 41 is adapted to receive the free end of an arm 42. A set screw 43 (see Figure 2) secures the arm to the rod 37. In order to have the force of the arm 42 applied in the direction of the longitudinal axis of the rod 37, I connect the arm 42 to a yoke 44 that is slidably mounted upon a guide pin 45. The guide pin 45 is carried by the cover 13 and is disposed directly in back of the tube 36. The yoke 44 is pivotally secured to the lever 26 so as to be moved when the lever is moved. It will be seen from this construction that when the lever 26 is actuated it will move the arm 42 in a plane parallel with the longitudinal axis of the rod 37. In this way lateral strain upon the rod is eliminated.

It should be noted at this point that the reason for connecting the arm 42 to the rod 37 by the set screw 43 is to permit the rod to be removed from the tube for cleaning. This is a vital feature of the device since the pulsator is the heart of the machine and should therefore operate efficiently at all times.

As heretofore stated, a vacuum is created within the can 6 and it is the duty of the rod 37 to intermittently place the teat cups 46 in communication with the interior of the can 6 and then in communication with the atmosphere, whereby a pulsating action is created in the teat cups. The rod 37 is moved up and down within the tube 36 and when in the position shown in Figure 4, it uncovers openings 47 in the tube. The openings 47 communicate with flexible pipes 48 that in turn are attached to the teat cups 46. As long as the rod 37 or plunger is in the position shown in Figure 4, the vacuum within the can 6 will draw the milk from the cow and will convey it through the pipes 48 to the can. As soon as the rod 37 moves downwardly into its lowermost position, it will cut off the vacuum between the can and the teat cups, and will place the teat cups in communication with the atmosphere. This causes or produces a pulsating action which simulates calf milking.

From Figure 4 it will be noted that the lower end of the plunger or rod 37 carries a threaded shank 49 upon which is mounted a valve 50 made of a resilient substance, such as leather. The valve 50 is held in place by means of lock nuts 51 and these lock nuts are also adapted to compress the valve for taking up wear. Directly above the valve 50 the plunger 37 is provided with an annular portion 52 and this annular portion communicates with a longitudinal groove 53 that extends along the outer surface of the plunger 37 to a point above the top of the tube 36. In this way a direct air communication is provided from a point external of the machine to within the interior of the tube 36. When the plunger 37 is on its down stroke, the groove 52 communicates with pipes 48, thus admitting air under atmospheric pressure to the cow's udder, while the valve 50 cuts off the vacuum to the udder. In this way the teat cups are placed under atmospheric pressure.

From the foregoing description of the various parts of the device, the operation of the device is readily understood. The machine in use is first wheeled to the desired position and then the teat cups 46 are secured to the cow. The tube 36 in the present instance has two flexible pipes 48 communicating therewith, thus permitting two cows to be milked at the same time. It is obvious that this number may be increased if desired. The engine is first started and then the pump is connected to the motor by means of the clutch 21. The movement of the pump will create a vacuum within the can as heretofore described. While the pump is being actuated, the pulsator will also be actuated so as to milk the cows. The milk is conveyed into the can where it is temporarily stored. As heretofore stated, the pulsator first connects the teat cups to the can so as to place a vacuum on the cups, and then places the cups in communication with the atmosphere.

The pulsator can be disassembled and readily cleaned by merely disconnecting the arm 42 from the plunger 37 as heretofore described. At this time the nuts 51 may be tightened so as to expand the valve 50 to take up wear. After the can has been filled with milk the cover 13 may be removed and an empty can substituted for the filled can. The cover is provided with a rubber gasket that is adapted to hermetically seal the can when the cover is clamped down into position.

The valve 50 is long enough to completely close the openings 47 as the plunger moves between its limits. If this were not so, the air would rush past the valve 50 when the valve was in registration with the openings 47, and relieve the vacuum within the tank which would defeat the purpose of the invention.

I claim:

1. A pulsator comprising a tubular member having a milk conduit, a plunger slidably disposed within the tubular member and being provided with an annular groove, said plunger having a longitudinal groove communicating with free air and said annular groove, elongated sealing means secured to said plunger adjacent said annular groove, means for compressing and expanding said elongated sealing means, and means for positively reciprocating the plunger for bringing said annular groove in communication with said milk conduit.

2. A pulsator for a milking machine using vacuum suction and free air in the operation of milking, said pulsator comprising a tubular member having a milk conduit and one end in communication with said vacuum, a plunger having an annular groove and being slidably disposed within said tubular member, said plunger being provided with a longitudinal groove communicating with free air and said annular groove, elongated sealing means carried by the plunger, and means for positively reciprocating the plunger for bringing said milk conduit into communication with the vacuum and for bringing said annular groove into communication with said milk conduit, thereby permitting free air to pass into the milk conduit.

WARREN AQUILA SHIPPERT.